A. E. MILLER.
SPRING WHEEL FOR CONVEYANCES.
APPLICATION FILED JAN. 2, 1914.

1,179,131.

Patented Apr. 11, 1916.
2 SHEETS—SHEET 1.

Witnesses
A. B. Decker.
D. Decker.

Inventor
Arthur E. Miller
By Albert H. Decker
Attorney

A. E. MILLER.
SPRING WHEEL FOR CONVEYANCES.
APPLICATION FILED JAN. 2, 1914.
1,179,131.
Patented Apr. 11, 1916.
2 SHEETS—SHEET 2.
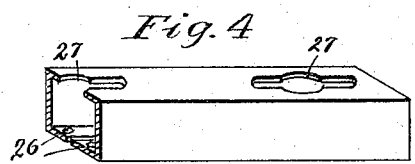
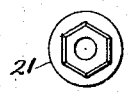
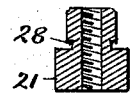
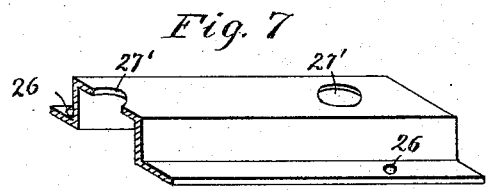
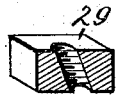
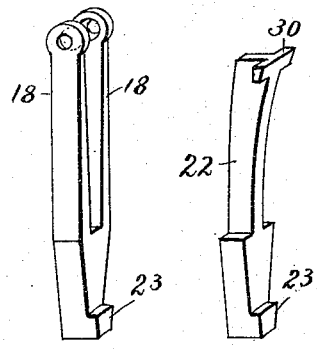
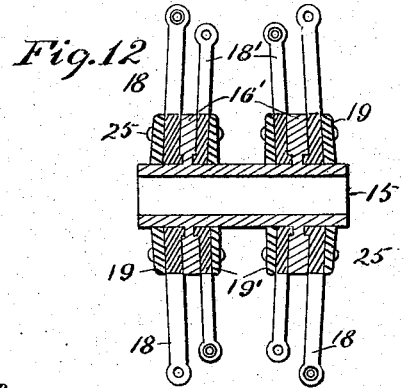
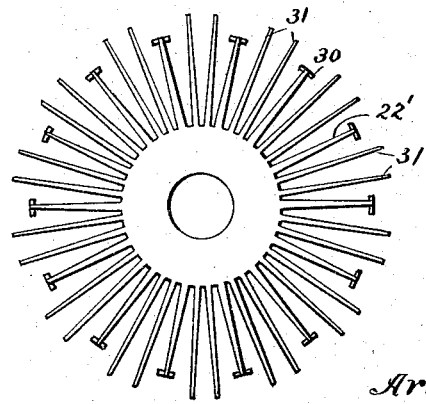
Witnesses
A. B. Decker.
D. Decker.
Inventor
Arthur E. Miller
By Delbert H. Decker
Attorney

UNITED STATES PATENT OFFICE.

ARTHUR E. MILLER, OF SACRAMENTO, CALIFORNIA.

SPRING-WHEEL FOR CONVEYANCES.

1,179,131.  Specification of Letters Patent.  Patented Apr. 11, 1916.

Application filed January 2, 1914. Serial No. 809,937.

*To all whom it may concern:*

Be it known that I, ARTHUR E. MILLER, a citizen of the United States, residing in the city of Sacramento, county of Sacramento, State of California, have invented a new and useful Spring-Wheel for Conveyances, of which the following is a specification.

The invention relates to that class of spring wheels for conveyances wherein the springs are interposed between the hub and the rim and it has for its object to so construct a metal wheel of this general class as to avoid the necessity for pneumatic or other forms of resilient tires and to produce a wheel that shall be light, easily repaired and durable.

To this end the invention consists in the structure of parts and in the combination thereof for the purpose specified substantially as hereinafter set forth and claimed.

Figure 1:
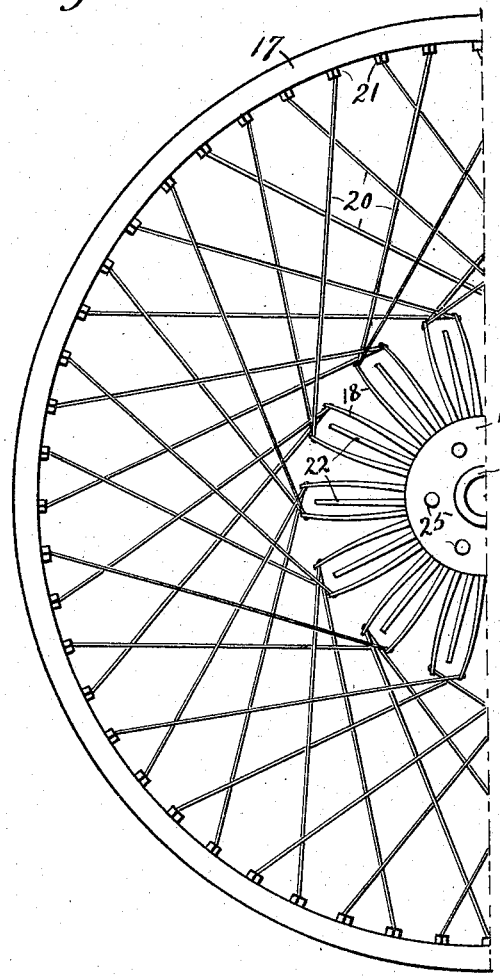
Figure 2:
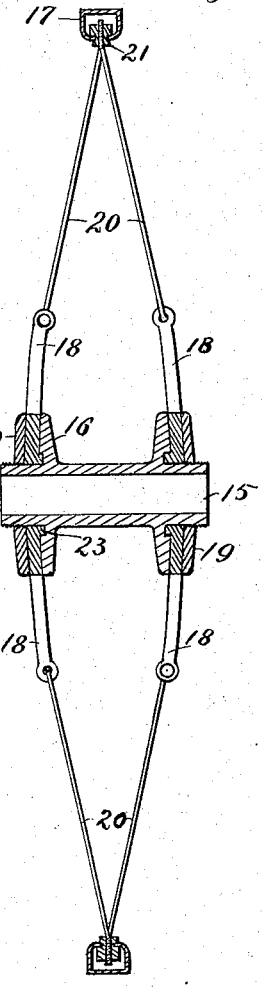
Figure 3:
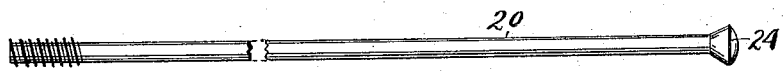

In the accompanying drawings which form a part of this specification Figure 1 shows in side elevation one half of the improved wheel; Fig. 2 is a diametrical section through the wheel; Fig. 3 shows one of the spokes on an enlarged scale; Fig. 4 shows in perspective a section of one form of rim; Fig. 5 is a plan and Fig. 6 an axial section of one form of spoke nut; Fig. 7 is a perspective view of a section of another form of rim; Fig. 8 is a sectionized perspective of one form of spoke nut; Fig. 9 is a side elevation of another form of spoke nut; Fig. 10 is a perspective view of two springs for use in the improved wheel; Fig. 11 is a like view of a form of abutment used between pairs of springs; Fig. 12 is an axial section through a hub showing two sets of springs attached thereto at each end; and Fig. 13 is a face view of a set of springs and abutments combined in one piece.

In the drawings, Figs. 1 and 2, 15 refers to the hub with its integral flanges 16, the rim in one form is indicated by 17, the springs by 18, their retaining collars, screwed onto the hub, being seen at 19, while the spokes are represented at 20 with their nuts 21 in the rim 17. The springs 18 are preferably formed in pairs as seen in Fig. 10 and between the pairs of springs abutments 22 are located, being held in place by collars against the flanges the same as are the springs. Both the springs and the abutments are preferably provided with toes 23 which stick into channels in the flanges 16 as shown. The outer ends of the springs are provided with countersunk holes to receive the spokes which have conoidal heads 24 and are screwthreaded at the other end to screw into their nuts in the rim of the wheel. The collars 19 may be further held in place by rivets or screws 25 passed through them into flanges 16. The spokes pass obliquely from their respective springs to their nuts in the rim and those from adjacent springs pass in opposite directions. The rim may take other forms as for example that shown in Fig. 4, which is really a false rim intended to be bolted to the real rim or tire through holes 26. This form of rim is provided with button-hole slots 27 in its inner wall for the reception of the nuts 21 provided with necks 28 for holding them in the restricted ends of said slots.

Another form of rim and the preferred form is seen in Fig. 7 wherein the securing flanges project outwardly and are provided with the holes 26 for securing it to the real rim or tire. In this form of rim circular holes 27' are formed for the reception of nuts such as 21' of Fig. 9 or the preferred form (29) of nut with oblique hole seen in Fig. 8. The nut 21' fills the hole 27' and the nut 29 blocks it from within, therefore both prevent dirt from entering the rim. The springs may be mounted on the hub in any suitable manner and associated in any desired number. They may be associated in pairs as in Fig. 10 or combined integrally with the abutments as in Fig. 13. An additional set of springs may be located at the inner sides of the hub flanges as seen at 18' in Fig. 12 in which case the collars 19' would necessarily be diametrically divided. The abutments may if desired be provided at their free ends with shoulders 30 to prevent the springs from slipping past them.

The invention claimed is—

1. In a spring wheel the combination with the hub and rim of radiating plate springs having their inner ends fixed to the hub and spokes attached to the outer ends of said springs and extending in substantially the same geometrical surface therewith to the rim and adjustable attachments in said rim for the spokes.

2. In a spring wheel the combination with a hub and rim of a set of radiating plate springs fixed at their inner ends to each end of the hub and spokes attached to the outer ends of said springs and to the rim, the groups of spokes and springs at each end of the hub being in the same conoidal surface.

3. The combination of a rim, a hub having a set of radiating springs at each of its ends, a set of radiating abutments fixed to each end of the hub and alternating with the springs in the respective sets, and spokes connecting the ends of the springs to the said rim.

4. A spring wheel consisting of a rim having spoke nuts located therein, a hub flanged at each end and having springs radiating therefrom in pairs at each flange, and spokes secured to the ends of said springs of each pair and extending in opposite directions across one another to the nuts in the rim.

5. The combination of a rim, a hub having a set of radiating springs at one end and a like set at the other, spokes extending to the rim in one direction from alternate springs in one of said sets, other spokes extending from the other springs of the same set to the rim in the opposite direction, and spokes extending in like manner to the rim from the ends of the springs in the other set.

6. A spring wheel consisting of a rim having spoke nuts located therein, a flanged hub having springs radiating therefrom in pairs, a radiating abutment interposed between the springs of each pair, and spokes secured to the ends of said springs of each pair and crossing in opposite directions to the nuts in the rim substantially as set forth.

7. The combination of a flanged hub, radiating springs fitted to the hub flanges, collars for securing said springs in place, a rim, and spokes extending to the rim from adjacent springs obliquely in opposite directions.

ARTHUR E. MILLER.

Witnesses:
CLINTON E. HARBER,
ALICE M. PACHALL.

Copies of this patent may be obtained for five cents each, by addressing the "Commissioner of Patents, Washington, D. C."